United States Patent
Chen et al.

(10) Patent No.: US 7,627,766 B2
(45) Date of Patent: Dec. 1, 2009

(54) SYSTEM AND METHOD FOR PROVIDING JAVA SERVER PAGE SECURITY

(75) Inventors: Tom Chen, Bridgewater, NJ (US); Anthony Piccirilli, New Castle, PA (US)

(73) Assignee: Computer Associates Think, Inc., Islandia, NY (US)

( * ) Notice: Subject to any disclaimer, the term of this patent is extended or adjusted under 35 U.S.C. 154(b) by 873 days.

(21) Appl. No.: 10/887,641

(22) Filed: Jul. 9, 2004

(65) Prior Publication Data

US 2005/0154888 A1    Jul. 14, 2005

Related U.S. Application Data

(60) Provisional application No. 60/486,819, filed on Jul. 11, 2003.

(51) Int. Cl.
*G06F 9/24* (2006.01)
(52) U.S. Cl. .................. 713/182; 713/189; 713/161; 713/167
(58) Field of Classification Search ............ 713/182, 713/159, 161, 189, 167
See application file for complete search history.

(56) References Cited

U.S. PATENT DOCUMENTS

| | | | |
|---|---|---|---|
| 5,940,590 A | 8/1999 | Lynne et al. | |
| 6,327,628 B1 | 12/2001 | Anuff et al. | |
| 6,519,647 B1 | 2/2003 | Dillingham et al. | |
| 6,697,849 B1 | 2/2004 | Carlson | |
| 2002/0046240 A1 | 4/2002 | Grady et al. | |

FOREIGN PATENT DOCUMENTS

| | | |
|---|---|---|
| EP | 1 233 333 A1 | 8/2002 |
| WO | WO 03/012666 A1 | 2/2003 |

OTHER PUBLICATIONS

"Java Server Pages [tm] Technology—White Paper", *The Source*, Sun Microsystems, Inc., pp. 1-6 <http://java.sun.com/products/jsp/whitepaper.html>, visited Jul. 26, 2004.

Mahmoud, Qusay H., "Developing Web Applications with JavaServer Pages 2.0", *The Source*, Sun Microsystems, Inc., pp. 1-12, Jul. 2003 <http://java.sun.com/developer/technicalArticles/javaserverpages/JSP20/>.

(Continued)

*Primary Examiner*—Thomas R Peeso
(74) *Attorney, Agent, or Firm*—Pillsbury Winthrop Shaw Pittman LLP

(57) ABSTRACT

A system and method for providing Java Server Page (JSP) security are provided. In one embodiment, a method for providing JSP security comprises selecting a JSP file at least partially in response to a request by a user. The request includes information identifying the user. A security tag associated with at least a portion of the JSP file is located for the selected JSP file. Authorization of the user to access the portion of the JSP file is determined based on the security tag. At least one web page is generated based, at least in part, on the determination.

32 Claims, 2 Drawing Sheets

OTHER PUBLICATIONS

Vivero, J., et al.; "MANBoP: Management of Active Networks Based on Policies"; University at Politecnica de Catalunya, Barcelona, Spain; Oct. 29, 2002; pp. 135-139.

Anand, R., et al.; "A Flexible Security Model for Using Internet Content"; Proceedings of the 16th Symposium on Reliable Distributed Systems; IEEE Computer Soc., US; Oct. 1997; pp. 89-96.
International Search Report for Appl. No. PCT/US2004/021970; Dec. 23, 2004; 7 pages.

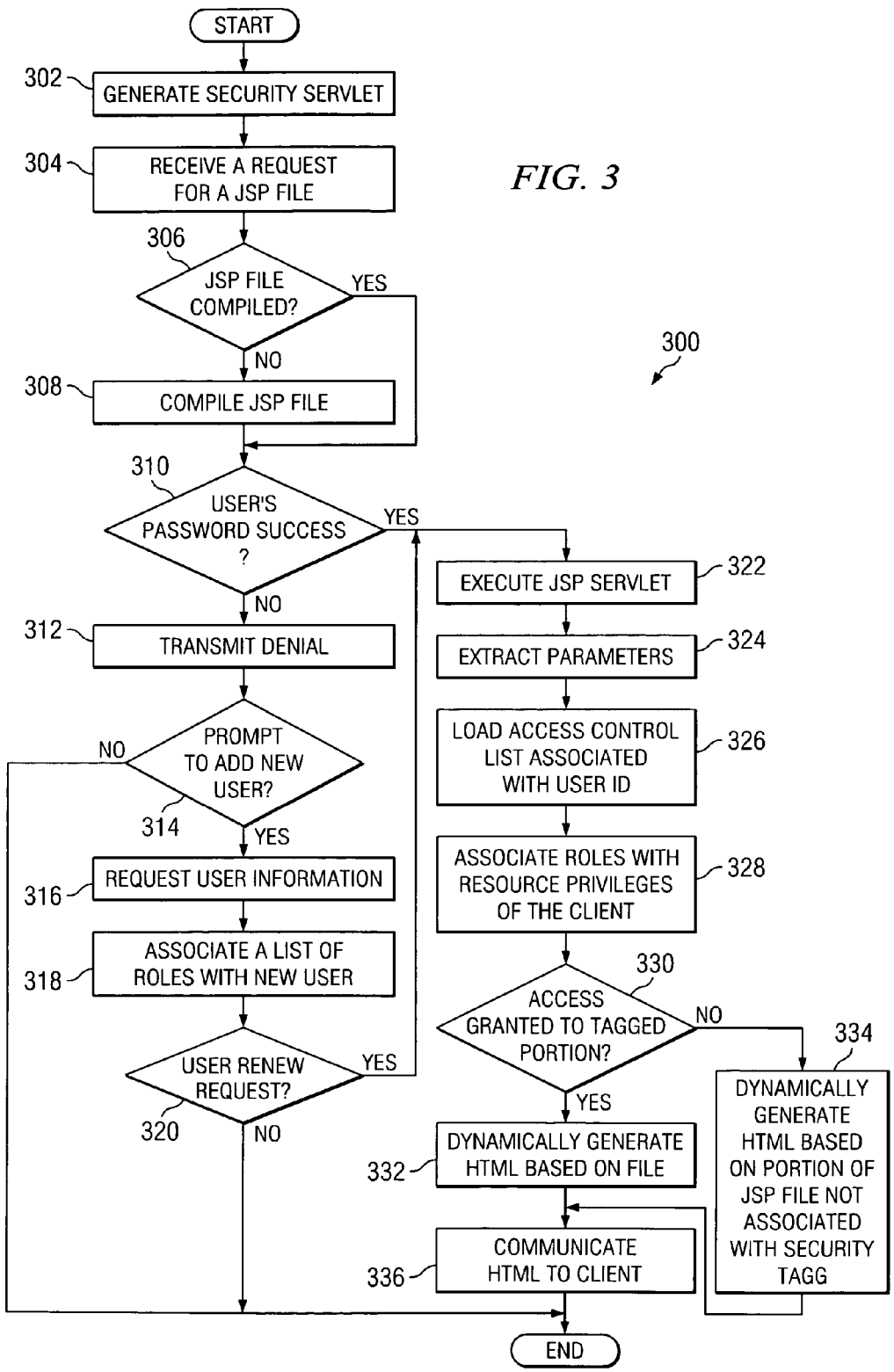

US 7,627,766 B2

1

SYSTEM AND METHOD FOR PROVIDING JAVA SERVER PAGE SECURITY

RELATED APPLICATION

This application claims the priority under 35 U.S.C. § 119 of provisional application Ser. No. 60/486,819 filed Jul. 11, 2003.

TECHNICAL FIELD

This disclosure relates generally to the field of networking and more particularly to a system and method for providing Java Server Page (JSP) security.

BACKGROUND

The growth of the Internet has led to the development of many platforms for creating dynamically-generated content accessible through web browsers. Each of these platforms provides a variety of tools and/or Application Program Interface (API) calls to support the development of dynamic web sites. For example, Java Server Page (JSP) is one of the more widespread technology for developing dynamically-generated web pages in web-based applications. JSP utilizes tag-based scripts to separate business logic from display logic.

SUMMARY

A system and method for providing Java Server Page (JSP) security are provided. In one embodiment, a method for providing JSP security comprises identifying a JSP file at least partially in response to a request by a user. The request includes information identifying the user. A security tag associated with at least a portion of the JSP file is located for the identified JSP file. Authorization of the user to access the portion of the JSP file is determined based on the security tag. At least one web page is generated based, at least in part, on the determination. The details of one or more embodiments of the disclosure are set forth in the accompanying drawings and the description below. Particular features, objects, and advantages of the disclosure will be apparent from the description and drawings and from the claims.

DESCRIPTION OF THE DRAWINGS

FIG. 3 is an exemplary flow diagram illustrating an example method for providing security management associated with JSP files in FIG. 1.

DESCRIPTION OF EXAMPLE EMBODIMENTS

Figure 1:
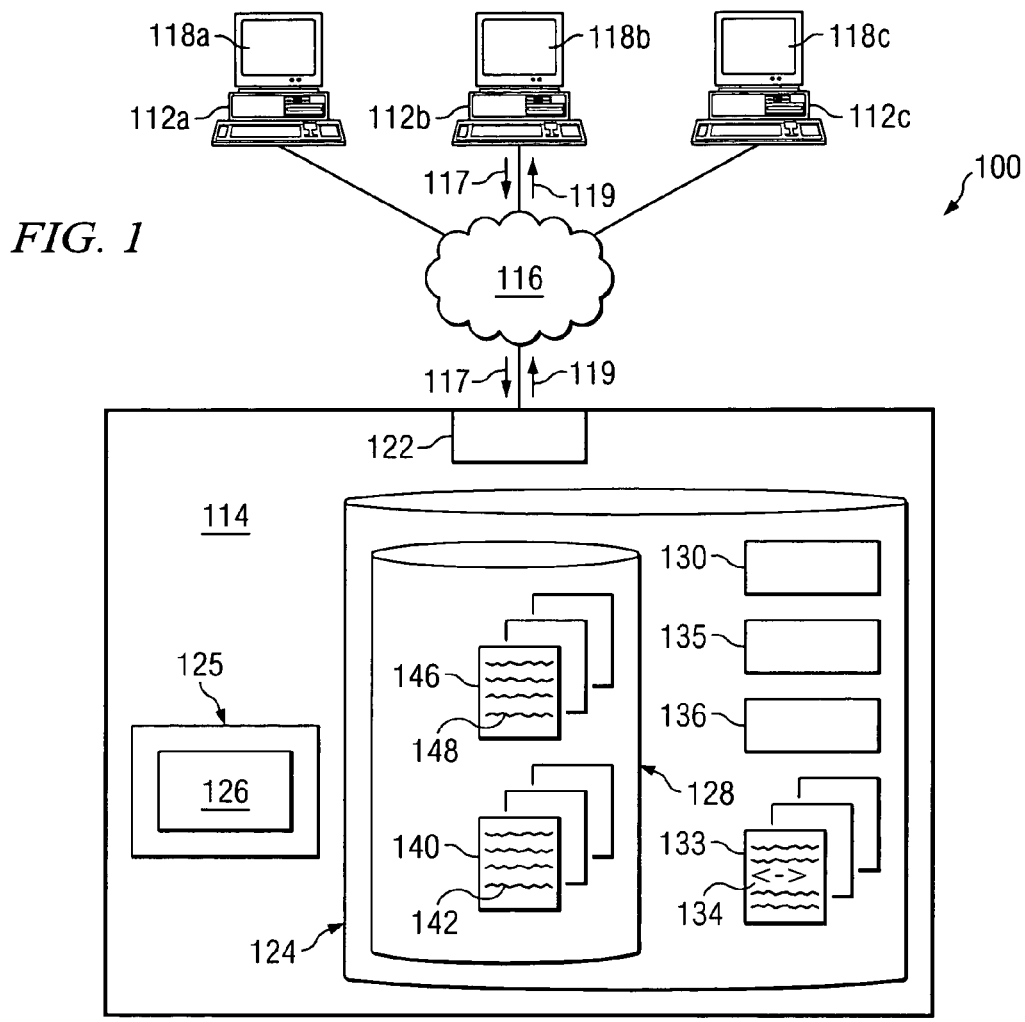
FIG. 1 is a block diagram illustrating an exemplary system for providing JSP security in accordance with one embodiment of the present disclosure.

FIG. 1 illustrates one embodiment of a system 100 for providing Java Server Page (JSP) security. At a high level, system 100 is a client/server environment comprising a plurality of clients 112a-c and at least partially secure server 114, but may also be a standard computing environment or any other suitable environment. For example, illustrated system 100 may be a portion of an enterprise security system that allows server 114 to grant or deny a client 112 access to a JSP file or portions of a JSP file according to a user's resource privileges. In general, system 100 secures portions of a JSP file through embedded security tags. As a result of these security tags, system 100 may reduce, minimize, or eliminate unauthorized accessing and viewing of information, such as business information. Additionally, using associated security tags, system 100 may present client 112 with a customized interface via network 116.

Network 116 facilitates wireless and/or wireline communication between network devices. Network 116 may include one or more Local Area Networks (LANs), Radio Access Networks (RANs), Metropolitan Area Networks (MANs), Wide Area Networks (WANs), all or a portion of the global network known as the Internet, and/or any other communication system or systems at one or more locations. Network 116 may communicate, for example, Internet Protocol (IP) packets, Frame-Relay frames, Asynchronous Transfer Mode (ATM) cells, voice, video, data, and other suitable information between network addresses. In certain embodiments, system 100 may generate requests and/or responses and communicate them to a workstation, server, or other computer systems located in network 103 such as, for example, client 112.

Client 112 is typically a computer that requests and receives services and information from server 114 via network 116. It will be understood that there may be any number of clients 112 coupled to server 114 or, alternatively, client 112 may comprise a management component of server 114. A user of client 112 may use client 112 for accessing JSP files. In general, client 112 may include input devices, output devices, mass-storage media, processors, memory, interfaces, communication ports, or other suitable components for communicating client requests 117 to server 114 and receiving responses via network 116, such as server responses 119. In one embodiment, client request 117 comprises a Uniform Resource Locator (URL) including a file name with a ".jsp" extension. As used in this document, client 112 is intended to encompass a personal computer, a work station, network computer, kiosk, wireless data port, personal data assistant (PDA), one or more processors within these or other devices, or any other suitable processing device. The present disclosure contemplates computers other than general purpose computers as well as computers without conventional operation systems. As used in this document, the term "computer" is intended to encompass a personal computer, workstation, network computer, or any other suitable processing. For example, client 112 may comprise a computer that includes an input device, such as a keypad, touch screen, mouse, or other device that can accept information, and an output device that conveys information associated with the operation of server 114 or clients 112, including digital data, visual information, or any other suitable information. Both the input device and output device may include fixed or removable storage media such as magnetic computer disk, CD-ROM, or other suitable media to both receive input from and provide output to users of client 112 through a portion of a data display, namely GUI 118.

GUI 118 comprises a graphical user interface operable to allow the user of client 112 to interface with system 100 to request and receive dynamically or otherwise generated web pages. The term "dynamically" as used herein, generally means that the appropriate processing is determined at run-time based upon the appropriate information. Generally, GUI 118 provides the user of client 112 with an efficient and user-friendly presentation of data provided by system 100, such as charts and tables. GUI 118 may comprise a plurality of displays having interactive fields, pull-down lists, and buttons operated by the user. It should be understood that the term "graphical user interface" may be used in the singular or in the plural to describe one or more graphic user interfaces in each of the displays of a particular graphical user interface. Further, GUI 118 contemplates any graphical user interface, such as a generic web browser, that processes information in system 100 and efficiently presents the information to the user. Server 114 can accept data from client 112 via the web browser (e.g., Microsoft Internet Explorer or Netscape Navigator) and return the appropriate Hyper Text Markup Language (HTML) or eXtensible Markup Language (XML) responses.

Server 114 is typically a computer that receives request for services and information from clients 112 and communicates responses to these request. In the illustrated embodiment, server 114 includes network interface 122, processor 125 and memory 124 and comprises an electronic computing device operable to receive, transmit, process and store data associated with system 100. Although FIG. 1 provides one example of server 114 that may be used with the disclosure, server 114 can be implemented using computers other than servers, as well as a server pool. For example, server 114 may comprise a general-purpose personal computer (PC) a Macintosh, a workstation, a UNIX-based computer, a server computer, or any other suitable device. According to one embodiment, server 114 may comprise a web server. Server 114 may be adapted to execute any operating system including UNIX, Linux, Windows, or any other suitable operating system. In short, server 114 may comprise software and/or hardware in any combination suitable to provide secured access to JSP files or portions of JSP files to client 112. For example, server 114 may grant or deny access to portions of a JSP file based on resource privileges associated with the user of client 112.

Server 114 includes interface 122 for communicating with other computer systems, such as client 112, over network 116 in a client-server or other distributed environment. In certain embodiments, server 114 receives JSP files from network 116 for storage in memory 124. Generally, interface 122 comprises logic encoded in software and/or hardware and a suitable combination and operable to communicate with network 116. More specifically, interface 122 may comprise software supporting one or more communications protocols associated with communication network 116 or hardware operable to receive and transmit physical signals encoding request for and responses regarding information stored in memory 124.

Memory 124 may include any memory or database module and may take the form of volatile or non-volatile memory including, without limitation, magnetic media, optical media, Random Access Memory (RAM), Read Only Memory (ROM), removable media, or any other suitable local or remote memory component. In this embodiment, memory 124 includes database 128, Application Program Interface (API) 130, a security servlet 136, a JSP servlet 135, and JSP files 133, but may also include any other appropriate files. Database 128 comprises any storage media for the storage and retrieval of information. According to one embodiment, database 128 may comprise a relational database normally accessed through Structured Query Language (SQL) statements. Server 114 may then invoke Java Database Connectivity (JDBC) to enable Java programs to execute SQL statements, allowing Java programs to interact with any SQL-compliant database. Alternatively, database 128 may comprise XML documents, flat files, or Comma-Separated-Value (CSV) files. In the illustrated embodiment, database 128 includes a plurality of access control lists 140 and a plurality of role profiles 146, but may include any other data, as appropriate.

Access control list 140 comprises any rules, instructions, algorithms any other directives used by server 114 to determine what role profiles 146 are associated with an identified client 112. Server 114 may identify a client 112 based on any appropriate characteristic such as, for example, a selection by client 112 or a user group, user identification (ID), password, IP address, logical location, or any suitable characteristic of client 112. Furthermore, the client 112 may be directly identified or otherwise associated with role profiles 146. Access control list 140 may be any suitable format such as, for example, an XML document, a flat file, CSV file, a name-value pair file, SQL table, or others. In one embodiment, access control list 140 comprises an encrypted table including a plurality roles 142. Access control list 140 may be created or modified by client 112, server 114, a third-party software vendor, or any other appropriate user or computer in system 100, loaded from a default access control list, or received via network 116. In summary, access control list 140 comprises any file including roles 142 associated with client 112 and operable to be processed by server 114.

Role 142 indicates what roles or positions are associated with client 112 and thus the role profiles 146 that are associated with access control list 140. Roles 142 may be of any appropriate data type, including float, integer, currency, date, decimal, string, or any other numeric or non-numeric format that indicates what profiles 146 should be retrieved from database 128. Further, each role 142 may comprise a file name, a memory address, URL, or any other suitable basis for determining a corresponding profile 146. In general, a role 142 may be associated with a user of client 112 and provide a basis for determining privileges that role 142 has with respect to a resource. For example, role 142 may indicate that client 112 has an administrative role of server 114 and identifies a corresponding role profile 146. Alternatively, role 142 may be other suitable roles such as, for example, a browsing role, customer role, vendor role, manager role, where each identify a corresponding role profile 146.

Role profile 146 comprises rules, instructions, algorithms, or any other directive used by server 114 to determine what resources an associated role 142 may access. A resource is information and/or a service provided by server 114 or other component of system 100. For example, a resource may include accounting information, administrative information, billing information, security data, management information, queue management services, administrative access. In the illustrated embodiment, a portion of JSP file 133 comprises a resource. Server 114 may associate role profile 146 and role 142 based on a selection by user of server 114, a selection received via network 116, a default selection, results of processing occurring at server 114, or any other suitable process. Role profile 146 may be any suitable format such as, for example, an XML document, a flat file, CSV file, a name-value pair file, SQL table, or others. In one embodiment, role profile 146 includes resource privileges 148. Role profile 146 may be created, modified, or supplied by client 112, server 114, a third-party software vendor, or any appropriate user of any computer in system 100, loaded from a default profile, or received via network 116.

Resource privilege 148 indicates whether an associated role 142 has privileges with a corresponding resource. In other words, server 114 grants or denies access to a resource based on a corresponding resource privilege 148. It will be understood that the absence of a resource privilege 148 from role profile 146 may indicate that the associated role 142 does or does not have privileges with the corresponding resource. Resource privilege 148 may be any appropriate data type, including float, integer, currency, date, decimal, string, or any other numeric or non-numeric format. For example, resource privilege 148 may include any suitable indicators that server 114 uses to grant or deny access to a resource.

Returning to memory 124, security API 130 comprises a conventional application program interface and may include class definitions for security management. In general, API 130 includes a set of routines, protocols, and/or tools used to generate programs. API 130 may comprise a file, script, executable, template or any other suitable description such that server 114 may generate security servlet 136. API 130 may be created or supplied by server 114, a third party, or any other suitable user of system 100. API 130 may be invoked from any suitable Java class including servlets, struts action classes, enterprise Java beans, and other suitable Java-based or Java-compatible classes. In one embodiment, API 130 includes either source code for class definitions written in or an executable code for class definitions based on any appropriate language such as, for example, C, C++, Java, Perl, and others. The class definitions are used to specify security management functions for security servlet 136. For example, security management functions may include verifying a user ID and password or determining privileges that a user ID has with respect to a resource based on roles associated with the user. For example, API 130 may comprise the following methods using corresponding parameters. The method "init" may initialize a user name and password. The method "doAuthentication" may be used to authenticate login of client 112. The method "doAuthorization" may be used to check a user's access privileges. The method "loadUserACL" may load a user's access control list (ACL) 140. The method "addUser" may add a new user. The method "addUser" may associate a user with new roles. The method "static void addUserRoles" may add a new role. The method "addRole" may associate roles with resources. The method "addRoleResources" may add a new resource. The method "addResource" may delete a user. The method "deleteUser" may remove roles from a user's role list. The method "deleteUserRoles" may delete a role. The method "deleteRole" may remove resources from role's resource list. The method "deleteRoleResources" may delete a resource. The method "deleteResource" may load list of resources from a flat file. The method "loadResourcesFromFile" may save the list of resources information to a flat file. The method "saveResourcesToFile" may change user's login password. The method "changePassword" may change a user's password. It will be understood that the example methods are for illustration purposes only. API 130 may comprise any logic operable to be invoked by server 114 to generate security servlet 136 and include none, some, or all of the illustrated methods as well as additional methods not illustrated.

Based on API 130 class definitions, API 130 may generate security servlet 136. Security servlet 136 comprises any software component operable to perform one or more security management functions such as filter-based authentication and role-based authorization. In certain embodiments, servlet 136 may be a server-side program based on a class defined in API 130 and written or based on any appropriate object-oriented programming language. In one embodiment, security servlet 136 is operable to receive parameters, invoke calls to database 128, perform security functions based on the received parameters, receive responses from database 128, and pass the results of the performed security functions to JSP servlet 135. Security servlet 136 may invoke JDBC to query database 128. In one embodiment, security servlet 136 compares the at least one resource privilege 148 to the received parameters to determine whether a user of client 112 is granted or denied access to JSP file 133 or a portion of JSP file 133. Security servlet 136 may also perform additional security management functions such as those listed above.

JSP file 133 is associated with one or more dynamic or otherwise web pages based, in part, on an identity of the user of client 112. JSP file 133 may comprise a text file that uses tags and scripts written in Java to generate the page content in response to a client request 117. It will be understood that JSP file 133 may alternatively be scripted with Java-based code, Java-compatible code, or code performing Java-like functions. The tags that may be included in JSP file 133 included HTML tags, XML tags, JSP tags, or other suitable tags. The HTML and/or XML tags may be associated with the page design and static content of the page, while the JSP tags and Java code comprise the logic used to generate the dynamic or otherwise web pages. For example, a JSP file 133 may be used to represent data in a tree/hierarchical structure. In this example, a node in the tree can be presented on the JSP page with text, icon, and folder status tabs and operable to be displayed with options such as links and menus. An exemplary JSP file 133 that provides such features and functions may include the following exemplary scripts:

```
<html>
<head>
<title>UMMQ Tree</title>
<%@ page import="java.sql.*" %>
<%@ page import="java.util.Date" %>
<%@ page import="com.ca.util.*" %>
</head>
<body onload="restoreTreeState( );">
<p align="center"><u> UMMQ Tree </u></p>
<%@ taglib uri="../WEB-INF/tree-tags.tld" prefix="ummq" %>
<% String browser = request.getHeader("User-Agent");
int max = 5; %>
<ummq:tree level="-1" text="" script="true"
browser="<%=browser%>" id="-1"
/>
  <ummq:tree level="0" text="USA" icon="webpage.gif"
  menu ="QMENU"
leaf="false"id="123" >
    <ummq:tree level="1" text="Virginia" icon="wevpage.gif"
menu ="QMENU" leaf="true" id="124" />
    <ummq:tree level="1" text="Pennsylvania" icon="webpage.gif"
menu ="QMENU" leaf="true" id="124" />
    <ummq:tree level="2" text="Pittsburgh" icon="webpage.gif"
menu ="QMENU" leaf="false" id="124" >
    <% for (int i=0; i < max; i++){
    String strid = "Customer-"=i;
    %>
    <ummq:tree level="3" text="<%=strid%>" icon="silverball.gif"
leaf="true"
      link="../jsp/logon.jsp" menu ="QMENU" id="<%=strid%>" />
    <% } %>
    </ummq:tree>
  </ummq:tree>
  </ummq:tree>
  </body>
</html>
```

In the exemplary script, 'level' indicates node level or position within the tree. The parameter 'text' indicates a label to be displayed on the node and 'icon' identification to be displayed. The parameter 'leaf' indicates the node is a leaf or folder, 'link' indicates a hyperlink to html or JSP, and 'menu' identifies a type of menu to be displayed on right click. The node is uniquely identified by 'id.' The above script is for illustration purposes only and any appropriate features and functions may be used in JSP file 133 to provide a dynamic or otherwise web page.

JSP file 133 may be created or modified by server 114, a third-party software vendor, or any other suitable user of any computer in system 100. JSP file 133 may also be loaded from a default file or received via interface 122. JSP file 133 may be noted by the extension ".jsp" or any other suitable extension. In one embodiment, JSP file 133 includes at least one security tag 134 associated with a portion of JSP file 133. Alternatively, security tag 134 may be located outside the file (not illustrated) and otherwise associate with the portion. In this embodiment, security tag 134 is a JSP tag but may alternatively be a JSP-based tag, JSP-compatible tag, or any other suitable command inserted in a file. Security tag 134 may include an embedded resource descriptor or ID that associates the security-tagged portion of JSP file 133 with a resource. For example, the following exemplary script includes an example security tag 134 that identifies a resource ID with the parameter 'resource':

```
<html>
<head>
<title>UMMQ Security</title>
</head>
<body>
<ummq: security resource="hello_world" />
<h3>Hello World! </h3>
</body>
</html>
```

The above script is for illustration purposes only and any appropriate security tag 134 and resource ID may be used to provide role-based security to JSP file 133 or a portion of JSP file 133.

Based on JSP file 133, server 114 automatically compiles JSP file 133 into JSP servlet 135 in response to an initial client request 117 for JSP file 133. The term "automatically" as used herein, generally means that the appropriate processing is substantially performed by some component of system 100. JSP servlet 135 comprises any software component operable to receive and process HTTP request, perform the Java-based logic embedded in JSP file 133, and generate the dynamic or otherwise pages. In one embodiment, JSP servlet 135 comprises an executable Java class file. JSP servlet 135 may be based, at least in part, on classes written Java, Java-based, and Java-compatible languages. JSP servlet 135 may be further operable to pass parameters (e.g., embedded resource ID, user ID, etc.) to and receive response from security servlet 136. Based on these responses, JSP servlet 135 may grant or deny access to a portion of a requested JSP file 133 associated with security tag 134. For example, JSP servlet 135 may transmit client response 119 including a dynamically generated web page to client 112 that excludes HTML associated with the security tag. It will be understood that while JSP servlet 135, API 130, security servlet 136 are illustrated as separate modules, JSP servlet 135, API 130 and security servlet 136 may comprise a child or submodule of another software module without departing from the scope of this disclosure.

Processor 125 executes instructions and manipulates data to perform operations of server 114. Although FIG. 1 illustrates a single processor 125 in server 114, multiple processors 125 may be used according to particular needs, and referenced to processor 125 is meant to include multiple processors 125 where appropriate. In the illustrated embodiment, processor 125 includes or executes JSP engine 126. JSP engine 126 may receive requests 117 and processes JSP file 133. Regarding the illustrated embodiment, JSP engine 126 receives and decodes client request 117 for JSP file 133 associated with a dynamic web page. In response to a client request 117, JSP engine 126 may compile the requested JSP file 133. JSP engine 126 may include any hardware, software, firmware, or combination thereof operable to receive client request 117 and compile JSP file 113. It would be understood that JSP engine 126 is illustrated as a single multi-task module, but the features and functionality performed by this engine may be performed by multiple modules.

In one aspect of operation, API 130 generates security servlet 136 based on instructions received from server 114 or network 116. A user of client 112 transmits a client request 117 including a request for a JSP file 133 to server 114 via network 116. Client request 117 may additionally include a user ID and password. JSP engine 126 receives and decodes the client request 117. If the request JSP file 133 has not been compiled, JSP engine 126 parses out the Java code and JSP tags from the requested JSP file 133 to generate an executable JSP servlet 135, which is operable to receive client request 117.

During execution of JSP servlet 135, JSP servlet 135 invokes security servlet 136 and passes parameters including, for example, resource IDs, user ID, password, or other suitable information to security servlet 136. Based, in part, on the user ID, security servlet 136 invokes JDBC to query database 128 to retrieve an access control list 140, including roles 142 associated with the user ID. Based upon the retrieved roles 140, security servlet 136 again invokes JDBC to query database 128 to retrieve role profiles 146 associated with each retrieved role 140. Once role profiles 146 including resource privileges 148 are retrieved, security servlet 136 compares the resource ID embedded in security tag 134 with the retrieved resource privileges 148. Referring to the example security tag 134 illustrated above, the resource ID was "hello-world." In this example, security servlet 136 compares the resource ID 'hello-world' with the retrieved resource privileges 148. Based on this comparison, security servlet 136 may grant or deny the user of client 112 access to the portion of the JSP file 133 associated with the security tag 134. Referring to the example, if security servlet 136 determines that the resource ID is included in or identified by resource privilege 148, then security servlet 136 may return a 'TRUE' to JSP servlet 135. Based on this status, JSP servlet 135 transmits the HTML to client 112. Otherwise, security servlet 136 returns 'False' to JSP servlet 135 that, based on this status, denies access to the illustrated HTML. Once this determination is made, a web page is dynamically generated that may or may not include the portion of JSP file 133 associated with security tag 134, and the web page is transmitted to client 112.

Figure 2:
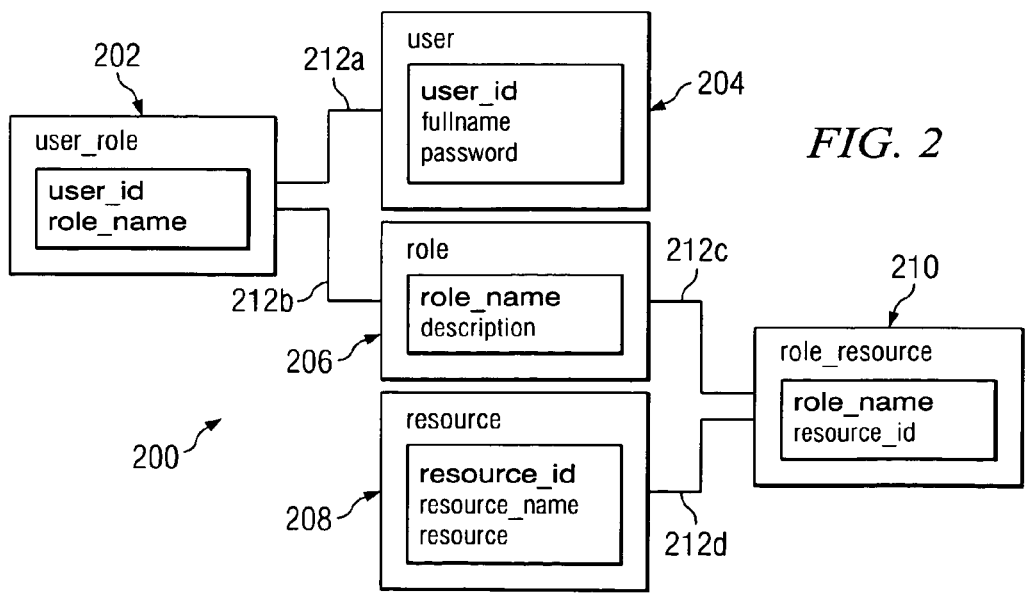
FIG. 2 illustrates an exemplary data schema for use in providing security management in the system of FIG. 1.

FIG. 2 illustrates one embodiment of a database schema 200 that may be accessed by security servlet 136. Using this database schema, both filter-based authentication and role-based authorization may be provided. Referring to FIG. 2, database schema 200 includes user-role 202, user 204, role 206, resource 208 and role-resource 210. The associations between components are illustrated by links 212. User-role 202 stores a user-id and at least one role-name associated with the user-id. As illustrated, user-role 202 may comprise access control list 140. User 204 is associated with user-role 202 via link 212a and stores a full name and password associated with the user-id. User 204 may be queried by security servlet 136 or another processor to provide login-based security. Role 206 is associated with user-role 202 via link 212b and stores a description of the role-name. Resource 208 stores a resource-name and resource associated with the resource-id. Role-resource 210 is associated with user-role 202 via 212c and 212b and resource 208 via 212d. Role-resource ID is associated with the role-name. As illustrated, role-resource 210 may comprise role profile 146, which may be queried by security servlet 136 to provide role-based user security management. It will be understood that the various components of the illustrated schema 200 may be combined or omitted additional components may be added according to particular needs, and such components may comprise multiple components. Additionally, the illustrated schema may be implemented using the example methods of API 130 listed above. It will be understood that these are only exemplary data schema and class definitions and other features and functions may be implemented without varying from the scope of this disclosure.

FIG. 3 is an exemplary flow diagram illustrating a method 300 for providing JSP security. Method 300 is described with respect to security system 100 of FIG. 1, but method 300 could also be used by any other system. Moreover, system 100 may use any other suitable technique for performing these tasks. Thus, many of the steps in this flowchart may take place simultaneously and/or in different orders as shown. Moreover, system 100 may use methods with additional steps, fewer steps, and/or different steps, so long as the methods remained appropriate.

Method 300 begins at step 302 where server 114 generates a security servlet 136 based on a request received by a user of server 114 or network 116. Next, at step 304, server 114 receives a client request 117 for a JSP file 133. The client request may include a user ID and password. JSP file 133 includes at least one portion of JSP file 133 associated with security tag 134 which includes an embedded resource ID. At decisional step 306, JSP engine 126 determines if the request JSP file 133 has been compiled. If JSP file 133 has not been compiled, then JSP engine 126 parses the JSP tags and Java code from JSP file 133 to generate JSP servlet 135 at step 308. If JSP file 133 has been compiled, then the execution proceeds to decisional step 310. At decisional step 310, if the user of client 112 is denied access to JSP file repository 132, then JSP engine 126 transmits a denial of access to client 112 at step 312. At decisional step 314, if the user of client 112 declines to add a new user of server 114, then the execution ends. For example, security servlet 136 may query user 204 illustrated in FIG. 2 to compare the received user ID and password with those stored in user 204. If the user of client 112 agrees to add a new user of server 114, then server 114 requests user information including user ID, password, or other suitable information at step 316. At step 318, access control list 140 is generated and associated with the new user ID and includes a list of roles 142. At decisional step 320, if the new user declines to renew the request for JSP file 133, then execution ends. If the new user renews request for JSP file 133, then execution proceeds to step 322. At step 322, JSP engine 126 executes JSP servlet 135. At step 324, JSP servlet 135 extracts embedded resource ID from security tag 134 and user ID from client request 117. For example, the resource ID may comprise "account-numbers" indicating the requested resource is associated with accounting and the user ID may comprise "USER1."

Security servlet 136 loads access control list 140 including roles 142 associated with the user ID at step 326 Referring to the example, security servlet 136 loads an access control list 140 associated with "USER1" and including roles 142 "Accounting" and "Human Resources" indicating that "USER1" has both accounting and human resources roles. Next at step 328, security servlet 136 loads role profiles 146 with corresponding resource privileges 148 associated with the retrieved roles 142. Continuing to refer to the example, security servlet 136 retrieves resource privileges 148 associated with the "Accounting" and "Human Resources" roles such as, for example, "account-numbers," "employees", or other suitable resource privileges 148 for each role 142 associated with "USER1." At decisional step 330, security servlet 136 compares the embedded resource ID to the retrieved resource privileges 148 to grant or deny access to the portion of the JSP file 133 associated with the security tag 134. In the example, security servlet 136 compares the resource ID "account-numbers" with the retrieved resource privileges 148, which includes "account-numbers," so security servlet 136 may communicate "TRUE" status to JSP servlet 135. If access is granted, then, at step 332, JSP servlet 135 dynamically generates HTML based on the entire JSP file 133. Based on the resource ID matching a retrieved resource privilege 148, JSP servlet 135 generates HTML based on JSP file 133. If the user is denied access to the tagged portion of the JSP file 133, then, at step 334, JSP servlet 135 dynamically generates HTML based on the rest of JSP file 133 not associated with security tag 134. At step 336, JSP servlet 135 communicates the HTML to client 112.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for providing Java Server Page (JSP) security, comprising:
    selecting a JSP file at least partially in response to a request by a user, the request including information identifying the user;
    locating for the selected JSP file a security tag associated with at least a portion of the JSP file;
    determining authorization of the user to access at least the portion of the JSP file based on the security tag; and
    generating at least one web page based, at least in part, on the determination.

2. The method of claim 1, further comprising determining authorization of the user to access at least the portion of the JSP file based on a role associated with the user.

3. The method of claim 1, further comprising denying access to the portion of the JSP file associated with the security tag and generating the web page based on the remainder of the JSP file to the user.

4. The method of claim 1, further comprising granting access to the portion of the JSP file associated with the security tag and generating the web page including the portion of the JSP file.

5. The method of claim 1, wherein the security tag associated with a portion of the JSP file and comprises a resource ID and the method further comprising invoking an application program interface (API) comprising class definitions for security management functions.

6. The method of claim 5, further comprising generating a security servlet based on the API and operable to grant or deny access to the portion of the JSP associated with the security tag.

7. The method of claim 6, further comprising:
    passing the resource ID to the security servlet; and
    denying access to the portion of the JSP file associated with the security tag based on the resource ID and the information identifying the user.

8. The method of claim 1, further comprising:
    storing a plurality of roles associated with the user in a database, each role associated with a role profile including a plurality of resource privileges;

accessing the resource privileges based on the plurality of roles associated with the user of the database; and determining authorization of the user to access at least the portion of the JSP file based on the resource privileges.

9. The method of claim 8, further comprising denying access to at least a portion of the JSP file based on the accessed resource privileges and the resource ID.

10. The method of claim 9, further comprising changing resource privileges associated with at least one role.

11. A computer readable storage medium storing computer executable instructions for providing JSP security, the instructions operable when executed to:

select a JSP file at least partially in response to a request by a user, the request including information identifying the user;

locate for the selected JSP file a security tag associated with at least a portion of the JSP file;

determine authorization of the user to access at least the portion of the JSP file based on the security tag; and generate at least one web page based, at least in part, on the determination.

12. The computer readable storage medium of claim 11, further operable to determine authorization of the user to access at least the portion of the JSP file based on a role associated with the user.

13. The computer readable storage medium of claim 11, further operable to deny access to the portion of the JSP file associated with the security tag and generate the web page based on the remainder of the JSP file to the user.

14. The computer readable storage medium of claim 11, further operable to grant access to the portion of the JSP file associated with the security tag and generate the web page including the portion of JSP file.

15. The computer readable storage medium of claim 11, wherein the security tag comprises a resource ID and the software further operable to invoke an API comprising class definitions for security management functions.

16. The computer readable storage medium of claim 15, further operable to generate a security servlet based on the API, the security servlet operable to grant or deny access to the portion of the JSP associated with the security tag.

17. The computer readable storage medium of claim 16, further operable to:

pass the resource ID to a security servlet; and deny access to the portion of the JSP file associated with the security tag based on the resource ID.

18. The computer readable storage medium of claim 11, further operable to:

store a plurality of roles associated with the user in a database, each role associated with a role profile including a plurality of resource privileges;

access the resource privileges based on the plurality of roles associated with the user of the database; and determine authorization of the user to access at least the portion of the JSP file based on the resource privileges.

19. The computer readable storage medium of claim 18, further operable deny access to at least a portion of the JSP file based on the accessed resource privileges and the resource ID.

20. The computer readable storage medium of claim 19, further operable to change resource privileges associated with at least one role.

21. A system for providing JSP security, comprising:

memory operable to store information associated with a plurality of JSP files and information associated with a user of a client; and one or more processors operable to:

select a JSP file at least partially in response to a request by a user, the request including information identifying the user;

locate for the selected JSP file a security tag associated with at least a portion of the JSP file;

determine authorization of the user to access at least the portion of the JSP file based on the security tag; and generate at least one web page based, at least in part, on the determination.

22. The system of claim 21, the one or more processors further operable to determine authorization of the user to access at least the portion of the JSP file based on a role associated with the user.

23. The system of claim 21, wherein the security tag is associated with a portion of the JSP file and the one or more processors further operable to deny access to the portion of the JSP file associated with the security tag and generate the web page based on the remainder of the JSP file to the user.

24. The system of claim 21, wherein the security tag is associated with a portion of the JSP file and the one or more processors further operable to grant access to the portion of the JSP file associated with the security tag and generate the web page based on the entire JSP file.

25. The system of claim 21, wherein the security tag is associated with a portion of the JSP file and comprises a resource ID and the one or more processors further operable to invoke an API comprising class definitions of security management functions.

26. The system of claim 25, the one or more processors further operable to generate a security servlet based on the API, the security servlet operable to grant or deny access to the portion of the JSP associated with the security tag.

27. The system of claim 26, the one or more processors further operable to:

pass the resource ID to a security servlet; and deny access to the portion of the JSP file associated with the security tag based on the resource ID.

28. The system of claim 21, the memory further operable to store a plurality of roles associated with the user in a database, each role associated with a role profile including a plurality of resource privileges and the one or more processors further operable to:

access the resource privileges based on the plurality of roles associated with the user of the database; and determine authorization of the user to access at least the portion of the JSP file based on the resource privileges.

29. The system of claim 28, the one or more processors further operable deny access to at least a portion of the JSP file based on the accessed resource privileges and the resource ID.

30. The system of claim 29, the one or more processors further operable to change resource privileges associated with at least one role.

31. A method for providing JSP security, comprising:

selecting a JSP file at least partially in response to a request by a user, the request including information identifying the user, the JSP file comprising a portion of the JSP file with an associated security tag and a remainder of the JSP file, the security tag comprising a resource ID;

storing a plurality of roles associated with the user in a database, each role associated with a role profile including a plurality of resource privileges;

accessing the resource privileges based on the plurality of roles associated with the user of the database;

denying access the portion of the JSP file based on the accessed resource privileges and the resource ID; and dynamically generating a web page based on the remainder of the JSP file.

32. A system for providing Java Server Page (JSP) security, comprising:
  means for selecting a JSP file at least partially in response to a request by a user, the request including information identifying the user;
  means for locating for the selected JSP file a security tag associated with at least a portion of the JSP file;
  means for determining authorization of the user to access at least the portion of the JSP file based on the security tag; and
  means for generating at least one web page based, at least in part, on the determination.

* * * * *